(12) United States Patent
Teshima

(10) Patent No.: US 11,137,044 B2
(45) Date of Patent: Oct. 5, 2021

(54) RESIN-MADE IMPACT ABSORPTION MEMBER

(71) Applicant: Teijin Limited, Osaka (JP)

(72) Inventor: Masatomo Teshima, Matsuyama (JP)

(73) Assignee: Teijin Limited, Osaka (JP)

( * ) Notice: Subject to any disclaimer, the term of this patent is extended or adjusted under 35 U.S.C. 154(b) by 39 days.

(21) Appl. No.: 15/121,091

(22) PCT Filed: Feb. 9, 2015

(86) PCT No.: PCT/JP2015/053520
§ 371 (c)(1),
(2) Date: Aug. 24, 2016

(87) PCT Pub. No.: WO2015/125646
PCT Pub. Date: Aug. 27, 2015

(65) Prior Publication Data
US 2017/0016503 A1 Jan. 19, 2017

(30) Foreign Application Priority Data
Feb. 24, 2014 (JP) .............................. JP2014-032954

(51) Int. Cl.
*F16F 7/12* (2006.01)
*C08J 5/04* (2006.01)
(Continued)

(52) U.S. Cl.
CPC .............. *F16F 7/124* (2013.01); *B60R 19/34* (2013.01); *C08J 5/042* (2013.01); *B62D 21/15* (2013.01); *C08J 2377/06* (2013.01)

(58) Field of Classification Search
CPC ...... F16F 7/124; F16F 7/12; F16F 2224/0233; F16F 2224/0241; C08J 5/042; B60R 19/34
See application file for complete search history.

(56) References Cited

U.S. PATENT DOCUMENTS 4,495,790 A * 1/1985 Muto ..................... B21D 53/00
188/322.14
4,901,486 A * 2/1990 Kobori ..................... E04B 1/98
188/377

(Continued)

FOREIGN PATENT DOCUMENTS

FR 2784151 A1 4/2000
JP 2006027375 A 2/2006

(Continued)

OTHER PUBLICATIONS

Apr. 28, 2015—International Search Report—Intl App PCT/JP2015/053520.

(Continued)

*Primary Examiner* — Melody M Burch
(74) *Attorney, Agent, or Firm* — Banner & Witcoff, Ltd.

(57) ABSTRACT

Provided is a resin-made impact absorption member having a simple structure and excellent impact absorption performance. A resin-made impact absorption member made of a resin material and includes a hollow convex part having a bottom plane part, a top plane part, and an upright plane part that connects the bottom plane part and the top plane part, in which L defined by the following formula (1) is 0<L<1.1.

$$L=\{r\times\tan(45°-A/2)\}/t1 \qquad (1)$$

9 Claims, 6 Drawing Sheets

(51) Int. Cl.
*B60R 19/34* (2006.01)
*B62D 21/15* (2006.01)

(56) References Cited

U.S. PATENT DOCUMENTS

| | | | |
|---|---|---|---|
| 5,549,327 A * | 8/1996 | Rusche | B60R 21/04 |
| | | | 280/751 |
| 6,017,084 A | 1/2000 | Carroll, III et al. | |
| 6,199,942 B1 | 3/2001 | Carroll, III et al. | |
| 6,247,745 B1 | 6/2001 | Carroll, III et al. | |
| 6,679,967 B1 | 1/2004 | Carroll, III et al. | |
| 6,682,128 B2 | 1/2004 | Carroll, III et al. | |
| 8,075,048 B2 * | 12/2011 | Kimoto | B60R 21/34 |
| | | | 180/274 |
| 2002/0017805 A1 | 2/2002 | Carroll et al. | |
| 2002/0070584 A1 * | 6/2002 | Carroll, III | B32B 3/28 |
| | | | 296/187.03 |
| 2004/0178662 A1 | 9/2004 | Carroll et al. | |
| 2004/0221909 A1 * | 11/2004 | Horibe | B65H 51/205 |
| | | | 139/11 |
| 2005/0127718 A1 * | 6/2005 | Cormier | B29C 51/10 |
| | | | 296/214 |
| 2005/0147804 A1 * | 7/2005 | Harada | F16F 7/124 |
| | | | 428/292.1 |
| 2005/0161982 A1 | 7/2005 | Cormier et al. | |
| 2005/0252714 A1 * | 11/2005 | Goda | B29C 44/583 |
| | | | 181/252 |
| 2005/0269837 A1 | 12/2005 | Carroll et al. | |
| 2006/0011434 A1 | 1/2006 | Itou | |
| 2007/0187961 A1 | 8/2007 | Audi et al. | |
| 2008/0174152 A1 | 7/2008 | Cormier et al. | |
| 2013/0122262 A1 * | 5/2013 | Nagakura | D06M 15/227 |
| | | | 428/172 |
| 2014/0008925 A1 * | 1/2014 | Impero | F16F 7/12 |
| | | | 293/133 |
| 2014/0039114 A1 * | 2/2014 | Hagihara | B29C 43/222 |
| | | | 524/495 |
| 2015/0298637 A1 * | 10/2015 | Hase | B62D 25/02 |
| | | | 296/187.12 |
| 2015/0337917 A1 | 11/2015 | Tamada | |

FOREIGN PATENT DOCUMENTS

| | | | | |
|---|---|---|---|---|
| JP | 2012-125948 A | | 7/2012 | |
| JP | 2012-233583 A | | 11/2012 | |
| JP | 2012233583 A | * | 11/2012 | ............ A62B 1/22 |
| JP | 2014-005901 A | | 1/2014 | |
| WO | 2014002566 A1 | | 1/2014 | |

OTHER PUBLICATIONS

Jul. 11, 2017—(JP) Notification of Reasons for Refusal—App 2016-504043—Eng Tran.

Apr. 28, 2015—(PCT/JP) Written Opinion—App Eng Tran 2015/053520—Eng Tran.

Feb. 9, 2017—(EP) Extended Search Report—App 15752003.2.

\* cited by examiner r × tan(45° − A/2)

RESIN-MADE IMPACT ABSORPTION MEMBER

CROSS REFERENCE TO RELATED APPLICATIONS

This is a U.S. National Phase Application under 35 U.S.C. § 371 of International Application No. PCT/JP2015/053520, filed Feb. 9, 2015, which claims priority to Japanese Application No. 2014-032954, filed Feb. 24, 2014, the entire contents of each of which are incorporated herein by reference.

TECHNICAL FIELD

The present invention relates to a resin-made impact absorption member made of a resin material. More specifically, it relates to a resin-made impact absorption member excellent in an impact absorption characteristic by having a hollow convex part having a specific structure.

BACKGROUND ART

On the front part and the rear part of a vehicle body, in order to prevent the impact during collision from being directly transmitted to human bodies, for example, impact absorption members such as a crash box, a front side member, and/or a rear side member are frequently provided. Heretofore, such an impact absorption member is generally composed of a metal material. However, in recent years, since reduction in weight of vehicle bodies has been desired for the purpose of improving fuel efficiency and the like, there have been intensively performed studies on a resin-made impact absorption member in which the impact absorption member is composed of a resin material.

An impact absorption member generally has a hollow structure from the viewpoint of reduction in weight. In particular, in order to obtain an excellent impact absorption characteristic, it is considered that it is desirable to have a hollow structure having a standing plane whose direction is neat to a horizontal direction toward an impact input direction. Moreover, in the case where the impact absorption member is composed of a resin material, it is known that one having excellent mechanical properties can be produced by press molding as compared with injection molding. Therefore, conventionally, for obtaining a resin-made impact absorption member having a excellent impact absorption characteristic, there has been used a method of molding members made of a resin material by press molding and then conjugating the members so as to be a hollow structure having a standing plane whose direction is neat to a horizontal direction toward an impact input direction. For example, Patent Document 1 discloses a resin-made molded article in which, after a hat-shaped molded article is prepared by press molding a fiber-reinforced thermoplastic resin material, the hat articles are joined so that the concave parts of the hat-shaped ones face each other to form a closed cross section. However, since a step of joining the members made of a resin material is inevitable in the production process, the resin-made molded article as described in Patent Document 1 has a problem that the production process becomes complicated and thus productivity is poor.

From such a problem, it has been desired to obtain a resin-made impact absorption member excellent in an impact absorption characteristic as mentioned above by a simple process but it is not easy to obtain such a resin-made impact absorption member. For example, Patent Document 2 discloses a resin-made impact absorption member formed by press molding alone but it is pointed out that the resin-made impact absorption member is insufficient in the impact absorption characteristic for applying it to a use application in which relatively large impact is imparted, such as an impact absorption member for use in vehicle bodies.

PRIOR ART DOCUMENTS

Patent Documents

Patent Document 1: JP-A-2012-125948
Patent Document 2: JP-A-2012-233583

SUMMARY OF THE INVENTION

Problems that the Invention is to Solve

The present invention has been made in consideration of such problems and an object of the invention is to provide a resin-made impact absorption member capable of being produced by a simple production method and having an excellent impact absorption characteristic.

Means for Solving the Problems

As a result of intensive studies of the present inventors for solving the above problems, it becomes obvious that, although it is hitherto considered that an excellent impact absorption characteristic is obtained without exception by forming a hollow structure having a standing plane whose direction is near to a horizontal direction toward an impact absorption direction, there is a case where the impact absorption characteristic becomes insufficient by the formation alone in a resin-made impact absorption member. Accordingly, they have investigated a dominant factor thereof and, as a result, have found that a resin-made impact absorption member capable of achieving both of the excellent impact absorption characteristic and the productivity is obtained by adopting a hollow structure having a specific hollow convex part. Thus, they have accomplished the present invention.

In order to solve the above problems, the present invention provides a resin-made impact absorption member that is made of a resin material, including a hollow convex part having a bottom plane part, a top plane part, and an upright plane part that connects the bottom plane part and the top plane part, in which L defined by the following formula (1) is 0<L<1.1.

$$L=\{r \times \tan(45°-A/2)\}/t1 \quad (1)$$

In the above formula (1), r is a curvature radius [mm] at a boundary portion between the bottom plane part and the upright plane part, A is an angle [°] formed between a vertical direction against an in-plane direction of the bottom plane part and the upright plane part, and t1 is an average thickness [mm] of the upright plane part.

In the present invention, the hollow convex part may preferably be integrally formed as a single member.

In a resin-made impact absorption member of the present invention, in a case where an average thickness of the top plane part is t2, a ratio of t2 to t1, t2/t1, may preferably be 0<t2/t1<1.5.

Further, in a resin-made impact absorption member of the present invention, A may be preferably 0°<A<25°.

Still further, a resin-made impact absorption member of the present invention may preferably include a plurality of hollow convex parts.

Moreover, in a resin-made impact absorption member of the present invention, the resin material may preferably be a fiber-reinforced resin material containing a reinforcing fiber and a matrix resin. In such a case, prefereably the reinforcing fiber may have an average fiber length within a range of 1 mm to 100 mm and the fiber-reinforced resin material may have a compressive modulus of 10 GPa or more and a compressive strength of 150 MPa or more.

ADVANTAGE OF THE INVENTION

The resin-made impact absorption member of the invention serves advantages that it can be produced by a simple production method and can exhibit an excellent impact absorption characteristic.

MODE FOR CARRYING OUT THE INVENTION

The following will describe a resin-made impact absorption member of the present invention.

The resin-made impact absorption member of the invention is used for suppressing impact to another end side by absorbing impact energy that has been input to one end of the resin-made impact absorption member. Moreover, the resin-made impact absorption member of the invention is supposed to absorb impact toward a vertical direction to an in-plane direction of a bottom plane part thereof and is used for absorb impact received in a coaxial direction to a vertical direction against an in-plane direction of the bottom plane part. Hereinafter, the "coaxial direction to the vertical direction against an in-plane direction of the bottom plane part" is referred to as "impact absorption direction".

Furthermore, the above "impact absorption characteristic" means a value obtained by dividing an absorbed impact energy amount by weight. The larger the numerical value is, the more excellent the "impact absorption characteristic" is.

As mentioned above, the resin-made impact absorption member of the invention is a resin-made impact absorption member that is made of a resin material includes a hollow convex part having a bottom plane part, a top plane part, and an upright plane part connecting the bottom plane part and the top plane part, in which L defined by the following formula (1) is 0<L<1.1:

$$L=\{r \times tan(45°-A/2)\}/t1 \qquad (1)$$

In the above formula (1), r is a curvature radius [mm] at a boundary portion between the bottom plane part and the upright plane part, A is an angle [°] formed between a vertical direction against an in-plane direction of the bottom plane part and the upright plane part, and t1 is an average thickness [mm] of the upright plane part.

Figure 1A:
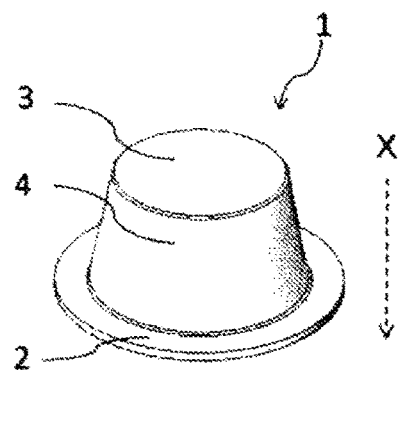
FIGS. 1A and 1B are schematic views showing one example of the resin-made impact absorption member of the invention.
Figure 1B:
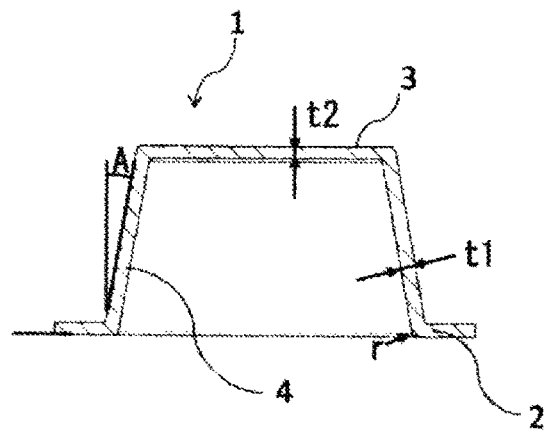
Figure 2:
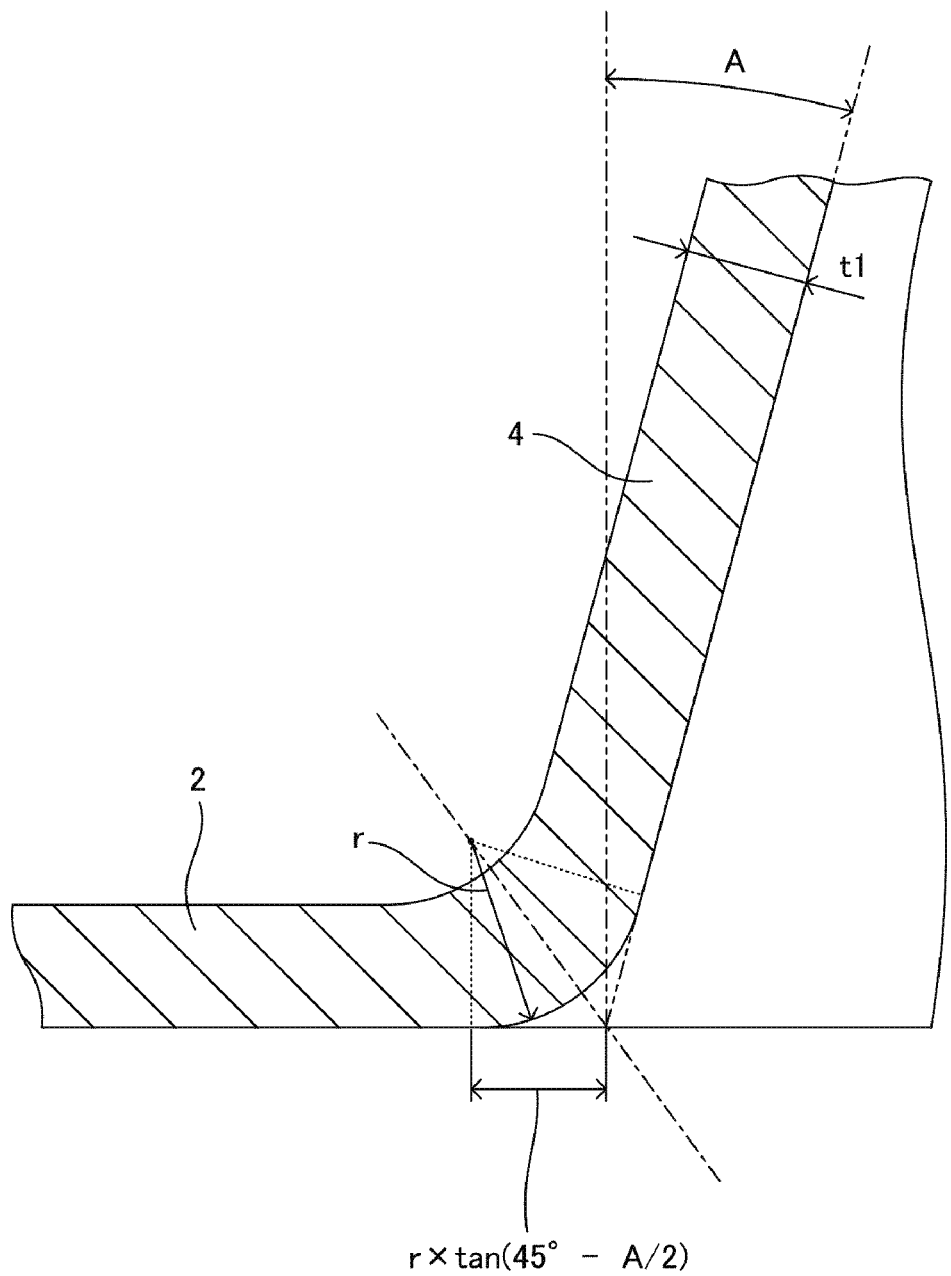
FIG. 2 is an enlarged view of a principal part of the resin-made impact absorption member of FIG. 1.

Such a resin-made impact absorption member of the invention will be described with reference to figures. FIGS. 1A and 1B are schematic views showing a representative example of the resin-made impact absorption member of the invention and FIG. 2 is an enlarged view of a principal part of the resin-made impact absorption member of FIGS. 1A and 1B. Here, FIG. 1B is a cross-sectional view of FIG. 1A in the impact absorption direction X. As exemplified in FIG. 1A, the resin-made impact absorption member 1 of the invention is made of a resin material and is provided with a hollow convex part having a bottom plane part 2, a top plane part 3, and an upright plane part 4 connecting the bottom plane part 2 and the top plane part 3. In addition thereto, the resin-made impact absorption member 1 of the invention is characterized in that L defined by the following formula (1) falls within the range of 0<L<1.1. Incidentally, r, A, and t1 defining L in the above formula (1) are as shown in FIG. 1B and FIG. 2. That is, r is a curvature radius [mm] at the boundary portion between the bottom plane part 2 and the upright plane part 4, A is an angle formed between a vertical direction against an in-plane direction of the bottom plane part 2 and the upright plane part 4, and t1 is an average thickness [mm] of the upright plane part 4. Moreover, t2 in FIGS. 1A and 1B is an average thickness of the top plane part 3 and a dotted line arrow X indicates the impact absorption direction of the resin-made impact absorption member 1.

In the resin-made impact absorption member of the invention, when L defined by the above formula (1) falls within the above range, a resin-made impact absorption member having excellent impact absorption characteristic can be obtained. Moreover, when the resin-made impact absorption member of the invention is provided with a hollow convex part having a bottom plane part, a top plane part, and an upright plane part connecting the bottom plane part and the top plane part, the member can be produced by press molding alone without using any welding step or the like. Accordingly, the resin-made impact absorption member of the invention can be produced by a simple production method and can exhibit an excellent impact absorption characteristic.

1 Regarding L

L (sine parameter) defined in the above formula (1) will be described. L is a "length of a tangent line of the above r", i.e., a value obtained by dividing the length from a contact point of the tangent line at an end of the boundary portion of the curvature radius r on the bottom plane part 2 side to an intersection point of the tangent line with a tangent line at an end of the boundary portion on the upright plane part 4 side by "thickness t1 of the upright plane part", and, in the defining formula of L, the denominator and the numerator have the same unit system. L is a value having an influence on the difference of the deformation state at the time when the impact absorption member receives impact energy. That is, since a space formed by taking r between the bottom plane part and the upright plane part decreases as the value of L decreases, the space can be prevented from becoming fracture origin. Thus, by preventing the space from becoming fracture origin, the resin-made impact absorption member can be sequentially fractured from the top plane part toward the bottom plane part when impact is imparted to the member and can exhibit an excellent impact absorption characteristic.

The resin-made impact absorption member of the invention is characterized in that the value of L is 0<L<1.1. In the invention, the reason why L is defined as falling within such a range is that, since the above space increases in the case where the value of L is 1.1 or more, the vicinity of the space becomes fracture origin at the time of impact absorption and thereby the impact absorption characteristic sharply decreases.

L in the resin-made impact absorption member of the invention is not particularly limited so long as it falls within the range of 0<L<1.1 and can be appropriately adjusted depending on the use application and the like of the resin-made impact absorption member of the invention. In particular, L falls preferably within the range of 0<L≤1.0, more preferably within the range of 0<L<0.85, and further preferably within the range of 0<L<0.6. The reason is as follows: when L falls within such a range, the vicinity of the space can be more effectively prevented from becoming fracture origin at the time of impact absorption, so that it is possible to further improve the impact absorption characteristic.

2 Hollow Convex Part

Next, the hollow convex part in the resin-made impact absorption member of the invention will be described. The hollow convex part in the invention has a bottom plane part, a top plane part, and an upright plane part connecting the bottom plane part and the top plane part. Here, in the hollow convex part in the invention, an internal space is formed by the bottom plane part, the top plane part, and the upright plane part but the internal space may be a void state or may be filled with the other material unless the material impairs the impact absorption characteristic of the resin-made impact absorption member of the invention.

The hollow convex part in the invention is preferably one in which the bottom plane part, the top plane part, and the upright plane part are integrally formed as a single member. Thereby, since the joining step for connecting the bottom plane part, the top plane part, and the upright plane part can be omitted at the time of forming the hollow convex part, the productivity of the resin-made impact absorption member of the invention can be made more excellent. Here, the "one in which the bottom plane part, the top plane part, and the upright plane part are integrally formed as a single member" means that the hollow convex part is not integrated by joining the bottom plane part, the top plane part, and the upright plane part afterward and they are integrally formed at the time of molding.

A specific shape of the hollow convex part in the invention is not particularly limited so long as the shape is a shape so that the part has the bottom plane part, the top plane part, and the upright plane part and L defined by the above formula (1) falls within the range defined by the invention. That is, as is apparent from the above formula (1), L is determined by A, r, and t1 but they are all factors resulting from the hollow convex part. Therefore, it is sufficient that the hollow convex part in the invention is formed so that at least, individual values of A, r, and t1 can result in L falling within the range defined by the invention, and the other factors (e.g., height H, length D of the opening, thickness t2 of the top plane part, thickness t3 of the bottom plane part, etc.; see FIGS. 6A and 6B for explanation of individual parts) relating to the hollow convex part may be appropriately determined according to the use application, the production method, and the like of the resin-made impact absorption member of the invention.

A, r, and t1 of the hollow convex part in the invention is not particularly limited so long as the above L falls within the range defined by the invention but, in particular, with regard to t1 in the invention, in the case where an average thickness [mm] of the top plane part is regarded as t2, the ratio t2/t1 falls preferably within the range of 0<t2/t1<1.5, and more preferably within the range of 0<t2/t1<1.1. The reason is as follows: thereby, a decrease in the impact absorption characteristic by the decrease in the ratio of the upright plane part in the hollow convex part can be prevented.

A specific value of t1 in the invention is not particularly limited so long as the above L falls within the range defined by the invention, resulting from the relation to the above A and r, but is usually controlled within the range of 1 mm to 15 mm but is not limited thereto.

Since the above t2 does not relate to the above L, t2 can be appropriately determined according to the use application, the production method, and the like of the resin-made impact absorption member of the invention. Since the ratio t2/t1 preferably falls within the above range in the invention as mentioned above, it is desirable to control a specific value of t2 so that the ratio t2/t1 falls within the above range with considering the specific value of t1. Accordingly, t2 in the invention is usually controlled within the range of 1 mm to 22.5 mm but is not limited thereto.

Moreover, the hollow convex part in the invention has a bottom plane part in addition to the above top plane part and upright plane part. Also with regard to an average thickness t3 of the bottom plane part, since it does not relate to the above L, it can be appropriately determined according to the use application, the production method, and the like of the resin-made impact absorption member of the invention. Since t1 and t2 are usually controlled within the ranges as mentioned above, t3 is also usually controlled within the range of 1 mm to 22.5 mm according thereto but is not limited thereto.

The above t1, t2, and t3 may be all the same or at least one may be different from the other two, or all of them may be different from one another. For example, when t1 is larger than t2 and t3, the ratio of the upright plane part in the hollow convex form in the invention can be increased, so that the impact absorption characteristic can be further improved.

Next, A in the invention will be described. A in the invention refers to the angle formed between a vertical direction against an in-plane direction of the bottom plane part and the upright plane part. Moreover, as shown in the formula (1), A in the invention relates to the above L. Therefore, the range of A in the invention is not particularly limited so long as the above L falls within the range defined by the invention, in the relation to the above t1 and r but, in particular, falls preferably within the range of 0°<A<25°, and more preferably within the range of 0°<A<20°. When A falls within the aforementioned range, a decrease in the impact absorption characteristic resulting from the falling of the upright plane part at the time of impact absorption can be prevented and thus an impact absorption characteristic equal to that of an impact absorption member in which the upright plane part is in a coaxial direction to the impact absorption direction can be exhibited.

In the hollow convex part in the invention, the above A may be the same all over the whole region of the boundary portion between the bottom plane part and the upright plane part or may be different depending on places. An embodiment wherein A is different depending on places of the boundary portion may be appropriately determined according to the use application of the resin-made impact absorption member of the invention and is not particularly limited.

Figure 4:
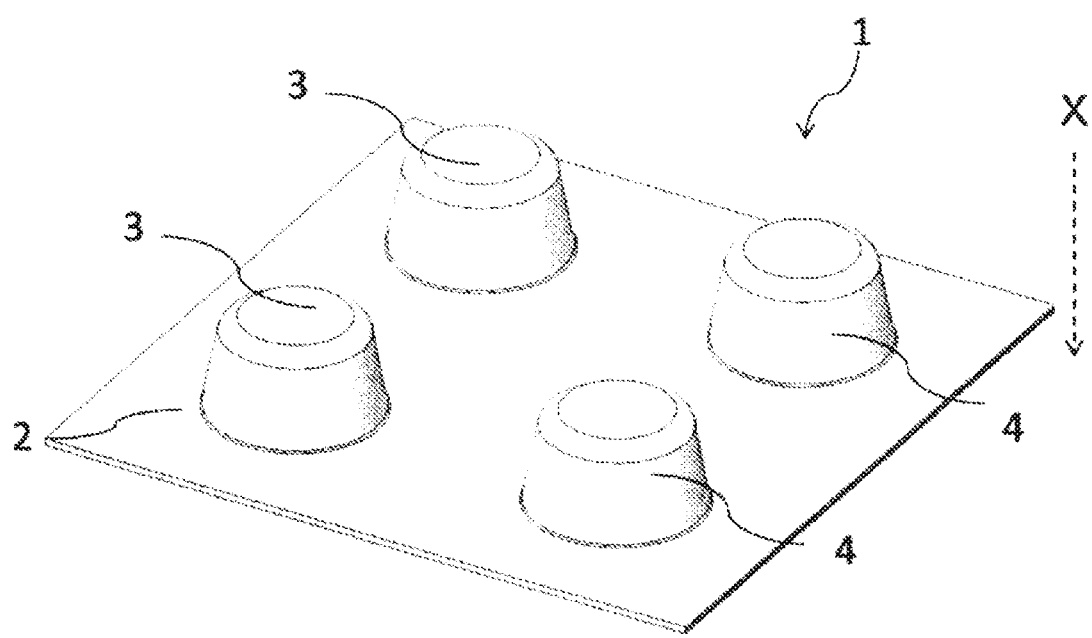
FIG. 4 is a schematic view of still another example of the resin-made impact absorption member of the invention.

Next, the above r will be described. r in the invention refers to a curvature radius [mm] of the boundary portion between the bottom plane part and the upright plane part. Here, the boundary portion between the bottom plane part and the upright plane part includes the boundary portion at an upper side of the bottom plane part and the boundary portion at a lower side of the bottom plane part but, in the case where a value of r is different at the both boundary portions, r in the invention means a curvature radius at the boundary portion at a lower side of the bottom plane part. Moreover, in the case where the curvature radius of the boundary portion is different depending on the place, r in the invention means an average curvature radius. Incidentally, the above r can be measured by R gauge or the like. The above "case where the curvature radius of the boundary portion is different depending on places" includes a case where the value r is different inside the same hollow convex part and also a case where the r value is different between different hollow convex parts in the case where the resin-made impact absorption member of the invention is provided with a plurality of hollow convex parts as shown in FIG. 4, for example.

A specific numerical value of r in the invention is not particularly limited so long as the above L falls within the range defined by the invention, in the relation to the above A and t1 and can be appropriately adjusted depending on the use application, the production method, and the like of the resin-made impact absorption member of the invention.

The hollow convex part in the invention may have a curved surface at the boundary portion between the upright plane part and the top plane part. In this case, the range of the curvature radius R of the boundary portion is not particularly limited and may be appropriately determined depending on the use application and the like of the resin-made impact absorption member of the invention.

Next, the resin-made impact absorption member of the invention absorbs impact through sequential fracture of the hollow convex part from the top plane part toward the bottom plane part at the time when the impact is input to the hollow convex part. Therefore, the height H of the hollow convex part becomes one factor having an influence on the energy absorption amount by the resin-made impact absorption member of the invention. Since the impact absorption characteristic of the resin-made impact absorption member of the invention can be improved in proportion to the height H, the above height H is appropriately determined so that an energy absorption amount suitable for the use application of the resin-made impact absorption member of the invention can be realized, depending on the kind of the resin material and the specific shape and the like of the hollow convex part. Incidentally, the height H of the hollow convex part refers to vertical distance from the lower face of the bottom plane part to the upper face of the top plane part. There is a case where the height H has a plurality of values depending on the shape of the hollow convex part but, in that case, the highest H value is regarded as the vertical distance.

The hollow convex part in the invention has a hollow structure but the cross-sectional shape in a vertical direction against the impact absorption direction is not particularly limited and can be appropriately determined depending on the use application and the like of the resin-made impact absorption member of the invention. As the cross-sectional shape, for example, there may be mentioned a true-circle shape, an ellipse shape, a polygon shape, shapes combining them, and the like but the shape is not limited thereto.

Preferably, the upright plane part 4 is formed into a tubular form and formed as a shape closed at a cross section in a vertical direction against the impact absorption direction. Thereby, the impact absorption characteristic can be enhanced.

Figure 3A:
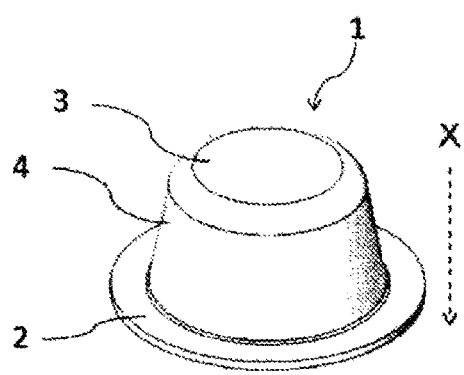
FIGS. 3A to 3D are schematic views of another example of the resin-made impact absorption member of the invention.
Figure 3B:
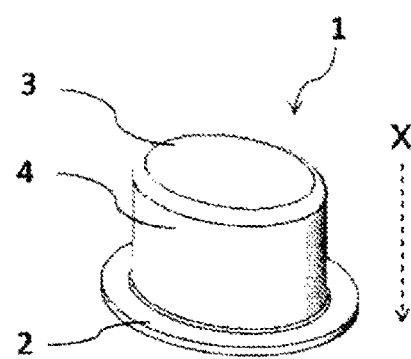
Figure 3C:
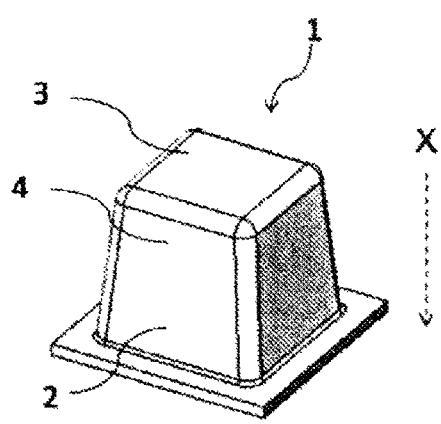
Figure 3D:
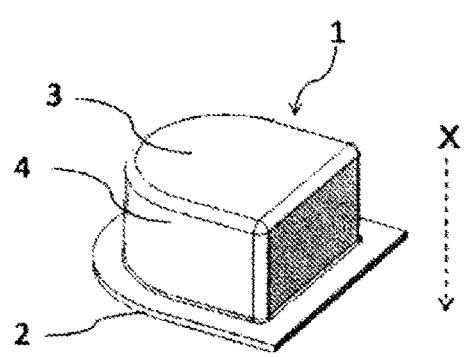

FIGS. 3A to 3D are schematic views showing various examples of the resin-made impact absorption member of the invention. As exemplified in FIGS. 3A to 3D, in the resin-made impact absorption member 1 of the invention, the cross-sectional shape in a vertical direction against the impact absorption direction X may be a true-circle shape (FIG. 3A), may be an ellipse shape (FIG. 3B), may be a polygon shape (FIG. 3C), and further may be a combination thereof (FIG. 3D). Incidentally, the reference numerals and signs in FIGS. 3A to 3D are the same as in FIGS. 1A and 1B.

Moreover, as mentioned later, in the case where the resin-made impact absorption member of the invention is provided with a plurality of hollow convex parts, the cross-sectional shapes of individual hollow convex parts may be all the same or different from each other.

3 Resin Material

Next, the resin material for use in the invention will be described. The resin material for use in the invention is not particularly limited so long as it can exhibit the desired impact absorption characteristic when it is formed into a hollow convex part in which L falls within the range defined by the invention. Therefore, depending on the use application of the resin-made impact absorption member of the invention, a thermoplastic resin may be used or a thermosetting resin may be used.

[Thermoplastic Resin]

Examples of the thermoplastic resin for use in the invention include polyolefin resins, polystyrene resins, thermoplastic polyamide resins, polyester resins, polyacetal resins (polyoxymethylene resins), polycarbonate resins, (meth)acrylic resins, polyarylate resins, polyphenylene ether resins, polyimide resins, polyether nitrile resins, phenoxy resins, polyphenylene sulfide resins, polysulfone resins, polyketone resins, polyether ketone resins, thermoplastic urethane resins, fluorocarbon resins, thermoplastic polybenzimidazole resins, and the like.

Examples of the polyolefin resins include polyethylene resin, polypropylene resin, polybutadiene resin, polymethylpentene resin, vinyl chloride resin, vinylidene chloride resin, vinyl acetate resin, polyvinyl alcohol resin, and the like.

Examples of the polystyrene resins include polystyrene resin, acrylonitrile-styrene resin (AS resin), acrylonitrile-butadiene-styrene resin (ABS resin), and the like. Examples of the polyamide resins include polyamide 6 resin (Nylon 6), polyamide 11 resin (Nylon 11), polyamide 12 resin (Nylon 12), polyamide 46 resin (Nylon 46), polyamide 66 resin (Nylon 66), polyamide 610 resin (Nylon 610), and the like. Examples of the polyester resin include polyethylene terephthalate resin, polyethylene naphthalate resin, polybutylene terephthalate resin, polytrimethylene terephthalate resin, liquid crystalline polyesters, and the like. Examples of the (meth)acrylic resins include polymethyl methacryalte. Examples of the modified polyphenylene ether resins include modified polyphenylene ether and the like. Examples of the thermoplastic polyimide resins include thermoplastic polyimides, polyamide imide resins, polyether imide resins, and the like. Examples of the polysulfone resins include modified polysulfone resins, polyether sulfone resins, and the like. Examples of the polyether ketone resins include polyether ketone resins, polyether ether ketone resins, and polyether ketone ketone resins. Examples of the fluorocarbon resins include polytetrafluoroethylene and the like.

The thermoplastic resin for use in the invention may be only one kind thereof or may be two or more kinds thereof. As an embodiment where two or more kinds of thermoplastic resins are used in combination, for example, there may be mentioned an embodiment where thermoplastic resins different in the softening point or melting point each other are used in combination, an embodiment where thermoplastic resins different in average molecular weight each other are used in combination, or the like but the embodiment is not limited thereto.

[Thermosetting Resin]

As examples of the thermosetting resin for use in the invention, for example, in the case of thermosetting resins, there may be mentioned cured products of epoxy resins, vinyl ester resins, unsaturated polyester resins, diallyl phthalate resins, phenol resins, maleimide resins, cyanate resins, benzoxazine resins, dicyclopentadiene resins, and the like and modified products thereof. The epoxy resins are not particularly limited so long as they have epoxy groups in the molecule and examples thereof include bisphenol A type epoxy resins, bisphenol F type epoxy resins, phenol novolak type epoxy resins, cresol novolak type epoxy resins, bisphenol AD type epoxy resins, biphenyl type epoxy resins, naphthalene type epoxy resins, alicyclic epoxy resins, glycidyl ester-based resins, glycidyl amine-based epoxy resins, heterocyclic epoxy resins, diaryl sulfone type epoxy resins, hydroquinone type epoxy resins, and modified products thereof and the like. Incidentally, the thermosetting resin for use in the invention may be only one kind thereof or may be two or more kinds thereof.

[Fiber-Reinforced Resin Material]

The resin material for use in the invention may be one made of the aforementioned thermoplastic resin or thermosetting resin alone but it is preferable to use a fiber-reinforced resin material in which the thermoplastic resin or thermosetting resin is used as a matrix resin and a reinforcing fiber is contained in the matrix resin. Heretofore, an impact absorption member has been generally composed of a metal material but, since such a fiber-reinforced resin material is excellent in strength per weight as compared with the metal material, the resin material is suitable for use as a substitute material for the conventional metal material.

(Reinforcing Fiber)

The kind of the reinforcing fiber can be appropriately selected depending on the kind and the like of the matrix resin and is not particularly limited. Therefore, as the reinforcing fiber for use in the invention, either an inorganic fiber or an organic fiber can be suitably used.

Examples of the inorganic fiber include carbon fibers, active carbon fibers, graphite fibers, glass fibers, tungsten carbide fibers, silicon carbide fibers, ceramic fibers, alumina fibers, natural fibers, fibers of minerals such as basalt, boron fibers, boron nitride fibers, metal fibers, and the like. Examples of the metal fibers include aluminum fiber, copper fiber, brass fiber, stainless fiber, and steel fiber. As the glass fibers, there may be mentioned those made of E glass, C glass, S glass, D glass, T glass, quartz glass fiber, borosilicate glass fibers, and the like.

Examples of the organic fiber include fibers made of resin materials such as polybenzazoles such as PBO (poly-p-phenylene benzoxazole), aramid, polyphenylene sulfide, polyesters, acryls, polyamides, polyolefins, polyvinyl alcohol, and polyarylates.

The reinforcing fiber for use in the invention may be one kind thereof or may be two or more kinds thereof. In the invention, in the case where two or more kinds of reinforcing fibers are used, plural kinds of inorganic fibers may be used in combination, plural kinds of organic fibers may be used in combination, or an inorganic fiber and an organic fiber may be used in combination. As an embodiment of using plural kinds of inorganic fibers in combination, for example, there may be mentioned an embodiment of using a carbon fiber and a metal fiber in combination, an embodiment of using a carbon fiber and a glass fiber in combination, and the like. On the other hand, as an embodiment of using plural kinds of organic fibers in combination, for example, there may be mentioned an embodiment of using an aramid fiber and a fiber made of another organic material in combination and the like. Furthermore, as an embodiment of using an inorganic fiber and an organic fiber in combination, for example, there may be mentioned an embodiment of using a carbon fiber and an aramid fiber in combination.

In the invention, it is preferable to use a carbon fiber as the reinforcing fiber. This is because a carbon fiber can afford a fiber-reinforced resin material excellent in strength in spite of lightweight. As the carbon fiber, there are generally known polyacrylonitrile (PAN)-based carbon fibers, petroleum/coal pitch-based carbon fibers, rayon-based carbon fibers, cellulose-based carbon fibers, lignin-based carbon fibers, phenol-based carbon fibers, vapor-grown carbon fibers, and the like but, in the invention, any of these carbon fibers can be suitably used.

The reinforcing fiber for use in the invention may be one attached with a sizing agent on the surface. In the case of using the reinforcing fiber attached with a sizing agent, the kind of the sizing agent may be appropriately selected depending on the kinds of the reinforcing fiber and the matrix resin and is not particularly limited.

The average fiber length of the reinforcing fiber for use in the invention is not particularly limited but preferably falls within the range of 1 to 100 mm, more preferably falls within the range of 5 to 75 mm, and further preferably falls within the range of 10 to 50 mm. The reason is as follows: when the average fiber length is shorter than the above range, depending on the use application of the resin-made impact absorption member of the invention, the compressive strength of the resin-made impact absorption member is insufficient as compared with a desired range and the impact absorption characteristic decreases in some cases; moreover, when the average fiber length exceeds 100 nm, a pitch of backing deformation increases at the time of impact absorption and thus the impact absorption characteristic becomes insufficient.

The average fiber length in the invention may be number-average fiber length or may be weight-average fiber length but it is preferable to measure the length as the weight-average fiber length in which calculation is made so as to give weight to fibers having a long fiber length. Here, when the fiber length of each carbon fiber is taken as Li and the number of measured fibers is taken as j, the number-average fiber length (Ln) and the weight-average fiber length (Lw) are determined by the following formulae (a) and (b).

$$Ln = \Sigma Li/j \qquad (a)$$

$$Lw = (\Sigma Li^2)/(\Sigma Li) \qquad (b)$$

Incidentally, in the case where the fiber length is constant, such as the case where the reinforcing fiber is cut with a rotary cutter, the number-average fiber length and the weight-average fiber length become the same value.

Incidentally, in the case where the average fiber length of the reinforcing fiber for use in the invention has a plurality of peak values, it is preferable that at least any one of the peak values falls within the aforementioned range.

The average fiber length of the reinforcing fiber for use in the invention may be appropriately determined depending on the kind and the like of the reinforcing fiber and is not particularly limited. For example, in the case where a carbon fiber is used as the reinforcing fiber, usually, the average fiber length preferably falls within the range of 3 μm to 50 μm, more preferably falls within the range of 4 μm to 12 μm and further preferably falls within the range of 5 μm to 8 μm. On the other hand, in the case where a glass fiber is used as the reinforcing fiber, usually, the average fiber length preferably falls within the range of 3 μm to 30 μm. Here, the average fiber length refers to a diameter of a single fiber of the reinforcing fiber. Therefore, in the case where the reinforcing fiber is in a fiber bundle form, the length refers to not a diameter of the fiber bundle but a diameter of the reinforcing fiber (single fiber) constituting the fiber bundle. The average fiber length of the reinforcing fiber can be measured by the method described in JIS R7607:2000. Incidentally, the content of JIS R7607:2000 is incorporated herein by reference.

The reinforcing fiber for use in the invention may be in a single fiber form composed of a single fiber regardless of the kind thereof or may be in a fiber bundle form composed of a plurality of single fibers. Moreover, the reinforcing fiber for use in the invention may be in a single fiber form alone, in a fiber bundle form alone, or in a mixed form thereof. In the case where one in a fiber bundle form is used, the number of the single fibers constituting each fiber bundle may be almost even in each fiber bundle or may be different. In the case where the reinforcing fiber for use in the invention is in a fiber bundle form, the number of the single fibers constituting each fiber bundle is not particularly limited but is usually controlled within the range of 1,000 to 100,000.

In general, a carbon fiber forms a fiber bundle form in which several thousand to several ten thousand of filaments (single fibers) are assembled. In the case where a carbon fiber is used as the reinforcing fiber, when the carbon fiber is used as it is, the entangled part of the fiber bundle is locally thickened and it becomes difficult to obtain a thin-walled fiber-reinforced material in some cases. Therefore, in the case where the carbon fiber is used as the reinforcing fiber, it is usual to use it after the fiber bundle is widened or opened.

In the case where the carbon fiber bundle is opened and used, the degree of opening of the carbon fiber bundle after opening is not particularly limited but it is preferable that the degree of opening of the fiber bundle is controlled and a carbon fiber bundle formed of a specific number or more of carbon fibers and a carbon fiber (single fiber) or carbon fiber bundle formed of carbon fibers whose number is less than the specific number are contained. In this case, specifically, it is preferable that the fiber bundle is formed of a carbon fiber bundle (A) constituted by carbon fibers of the critical number of single fiber defined by the following equation (2) or more and the other opened carbon fibers, i.e., a state of a single fiber or a fiber bundle constituted by carbon fibers of less than the critical number of single fiber.

Critical number of single fiber=600/$D$ (2)

Here, $D$ is an average fiber diameter (μm) of a carbon fiber.

Furthermore, in the invention, the ratio of the carbon fiber bundle (A) to the total amount of the carbon fibers in the fiber-reinforced resin material is preferably more than 0 Vol % and less than 99 Vol %, more preferably 20 Vol % or more and less than 99 Vol %, further preferably 30 Vol % or more and less than 95 Vol %, and most preferably 50 Vol % or more and less than 90 Vol %. This is because it becomes possible to increase the existing amount of the carbon fibers in the fiber-reinforced resin material, i.e., fiber volume content (Vf) when the carbon fiber bundle composed of a specific number or more of carbon fibers and the other opened carbon fiber or carbon fiber bundle co-exist in a specific ratio.

The degree of opeining of the carbon fiber can be controlled within an objective range by adjusting opeing conditions of the fiber bundle. For example, in the case where the fiber bundle is opened by blowing air to the fiber bundle, the degree of opening can be adjusted by controlling the pressure or the like of the air for blowing to the fiber bundle. In this case, there is a tendency that the degree of opening becomes high (the number of single fibers constituting each fiber bundle decreases) by increasing the pressure of the air and the degree of opening becomes low (the number of single fibers constituting each fiber bundle increases) by decreasing the pressure of the air.

In the invention, in the case where a carbon fiber is used as the reinforcing fiber, the average fiber number (N) in the carbon fiber bundle (A) can be appropriately determined within the range where the purpose of the invention is not impaired and is not particularly limited. In the case of a carbon fiber, the above N is usually controlled within the range of 1<N<12,000 but more preferably satisfies the following formula (3).

$$0.6 \times 10^4/D^2 < N < 1 \times 10^5/D^2 \quad (3)$$

Here, D is an average fiber diameter (μm) of the carbon fiber.

(Fiber-Reinforced Resin Material)

As mentioned above, the fiber-reinforced resin material for use in the invention contains a reinforcing fiber and a matrix resin but, in the invention, it is preferable to use a thermoplastic resin as the matrix resin. This is because, for example, in the case where the resin-made impact absorption member of the invention is produced by press molding, there are advantages that molding time can be shortened by using a thermoplastic resin as the matrix resin. Also, this is because there is a case where the fiber-reinforced resin material for use in the invention can be recycled or reused by using a thermoplastic resin as the matrix resin.

The compressive modulus of the fiber-reinforced resin material for use in the invention is not particularly limited so long as it falls within the range where a desired impact absorption characteristic can be imparted to the resin-made impact absorption member of the invention but, in particular, is preferably 10 GPa or more, more preferably 15 GPa or more, and further preferably 20 GPa or more. The reason is as follows: when the compressive modulus is smaller than the above range, rigidity of the hollow convex part is insufficient and there is a case where the impact absorption characteristic of the resin-made impact absorption member of the invention decreases. The compressive modulus of the fiber-reinforced resin material for use in the invention, which is controlled so as to be within the above range, for example, is achieved by, for example, a method of adjusting the content of the reinforcing fiber in the fiber-reinforced resin material, a method of adjusting the fiber length, or a method of changing the kind(s) of the reinforcing fiber or/and a matrix resin. More specifically, the compressive modulus can be increased by increasing the content of the reinforcing fiber, increasing the fiber length, or using a reinforcing fiber or/and matrix resin having a large compressive modulus. Moreover, the compressive modulus can be decreased when adjustment reverse to these is performed.

Moreover, the compressive strength of the fiber-reinforced resin material for use in the invention is not particularly limited but is preferably 150 MPa or more, more preferably 200 MPa or more, and further preferably 250 MPa or more. The reason is as follows: when the compressive strength of the fiber-reinforced resin material is smaller than the above range, the strength of the hollow convex part is insufficient and there is a case where the impact absorption characteristic of the resin-made impact absorption member of the invention decreases. The compressive strength of the fiber-reinforced resin material for use in the invention, which is controlled so as to be within the above range, for example, is achieved by, a method of adjusting the content of the reinforcing fiber in the fiber-reinforced resin material, a method of adjusting the fiber length, or a method of changing the kind(s) of the reinforcing fiber or/and a matrix resin. More specifically, the compressive strength can be increased by increasing the content of the reinforcing fiber, increasing the fiber length, or using a reinforcing fiber or/and matrix resin having large compressive strength.

Incidentally, the compressive modulus and compressive strength of the fiber-reinforced resin material can be measured, for example, by the method described in JIS K7076:1991. Incidentally, the contents of JIS K7076:1991 are incorporated herein by reference.

As mentioned above, the fiber-reinforced resin material for use in the invention contains at least a reinforcing fiber and a matrix resin but may contain various additives as needed within the range where the purpose of the invention is not impaired. The above various additives are not particularly limited so long as they can impart desired functions or natures to the fiber-reinforced resin material, according to the use application and the like of the resin-made impact absorption member of the invention. Examples of the various additives for use in the invention include a melt viscosity decreasing agent, an antistatic agent, a pigment, a softening agent, a plasticizer, a surfactant, a conducting particle, a filler, a carbon black, a coupling agent, a foaming agent, a lubricant, a corrosion inhibitor, a crystal nucleating agent, a crystallization accelerator, a mold releasing agent, a stabilizer, an ultraviolet absorber, a colorant, a coloring inhibitor, an antioxidant, a flame retardant, a flame retardant aid, a dripping inhibitor, a lubricant, a fluorescent brightening agent, a luminous pigment, a fluorescent dye, a fluidity improver, inorganic and organic antibacterial agents, an insect repellent, a photocatalyst-based antifouling agent, an infrared absorber, a photochromic agent, and the like.

Moreover, the fiber-reinforced resin material for use in the invention may contain a short fiber having a short fiber length as one of the various additives. As the short fiber to be used herein, those similar to the aforementioned reinforcing fiber can be used except that the average fiber length (weight-average fiber length, number-average fiber length) is shorter than that of the aforementioned reinforcing fiber. The short fiber has fiber length shorter than that of the aforementioned reinforcing fiber and, for example, there can be exemplified those having an average fiber length (weight-average fiber length, number-average fiber length) of 1 mm or less.

Incidentally, the above various additives can be similarly adopted also in the case where not the fiber-reinforced resin material but a thermoplastic resin or thermosetting resin containing no aforementioned reinforcing fiber is used as the resin material.

The existing amount of the matrix resin in the fiber-reinforced resin material for use in the invention can be appropriately determined depending on the kind of the matrix resin, the kind of the reinforcing fiber, and the like and is not particularly limited but is usually controlled within the range of 3 parts by mass to 1,000 parts by mass based on 100 parts by mass of the reinforcing fiber.

The volume content of the reinforcing fiber in the fiber-reinforced resin material for use in the invention is preferably 10 to 70 Vol %. The reason is as follows: when the volume content of the reinforcing fiber in the fiber-reinforced resin material is less than 10 Vol %, desired compressive modulus or compressive strength is not obtained and there is a case where the impact absorption characteristic becomes insufficient. On the other hand, when the volume content exceeds 70 Vol %, the fluidity of the fiber-reinforced resin material decreases and there is a case where it becomes difficult to obtain a desired shape during molding. A more preferable range of the volume content of the reinforcing fiber in the fiber-reinforced resin material is 20 to 60 Vol % and further preferable range is 30 to 50 Vol %.

Moreover, the existing state of the reinforcing fiber in the fiber-reinforced resin material is not particularly limited and, for example, may be in a one-direction oriented state or may be in a randomly oriented state. In particular, in the invention, from the viewpoint of shape rigidity and strength homogeneity in the resin-made impact absorption member, it is preferable to be in a two-dimensionally randomly oriented state in which the long axis direction of the reinforcing fiber is randomly oriented in an in-plane direction of the fiber-reinforced resin material. Here, the two-dimensional random orientation of the carbon fiber in the fiber-reinforced resin material can be confirmed, for example, by performing a tensile test using an arbitrary direction of the fiber-reinforced resin material and a direction orthogonal to the direction as standards to measure a tensile modulus and subsequently measuring a ratio (Eδ) obtained by dividing larger one of the measured values of the tensile modulus by smaller one. In the case where the ratio of the modulus is less than 2, the carbon fiber can be evaluated to be two-dimensionally randomly oriented and, in the case where the ratio of the modulus is less than 1.3, the case is evaluated as excellent two-dimensional random orientation.

(Method for Producing Fiber-Reinforced Resin Material)

Next, a method for producing the fiber-reinforced resin material for use in the invention will be described. The fiber-reinforced resin material for use in the invention can be produced by using generally known methods. For example, it can be produced by (1) a step of cutting the reinforcing fiber, (2) a step of opening the cut reinforcing fiber, (3) a step of mixing the opened reinforcing fiber and a fibrous or particulate matrix resin and subsequently heating and compressing them to obtain a prepreg, but the method is not limited thereto. Incidentally, in the case of this method, the prepreg is a fiber-reinforced resin material.

[Resin-Made Impact Absorption Member]

The resin-made impact absorption member of the invention has the aforementioned hollow convex part but the resin-made impact absorption member of the invention may have one hollow convex part or may have two or more hollow convex parts.

The case where the resin-made impact absorption member of the invention has a plurality of the hollow convex parts will be described with reference to a figure. FIG. 4 is a schematic view showing one example in the case where the resin-made impact absorption member of the invention has a plurality of the hollow convex parts. As exemplified in FIG. 4, the resin-made impact absorption member 1 of the invention may have a plurality of the hollow convex parts. Incidentally, the reference numerals and signs in FIG. 4 are the same as in FIGS. 1A and 1B.

The embodiment where the resin-made impact absorption member of the invention has a plurality of the hollow convex parts is not particularly limited and an embodiment suitable for the use application of the resin-made impact absorption member of the invention can be appropriately selected. Therefore, the embodiment may be, for example, an embodiment where a plurality of hollow convex parts having the same shape are used or an embodiment where hollow convex parts different in shape are used in combination. Moreover, the embodiment where hollow convex parts different in shape are used in combination may be an embodiment where L's of all the hollow convex parts fall within the range defined by the invention or an embodiment where hollow convex part(s) in which the above L falls within the range defined by the invention and hollow convex part(s) in which the above L falls out of the range defined by the invention are used in combination. Furthermore, the embodiment may be an embodiment where hollow convex parts made of different resin materials are used in combination.

The resin-made impact absorption member of the invention may be used singly depending on the use application or may be used in combination with the other member. As the embodiment where the resin-made impact absorption member of the invention is used in combination with the other member, there may be, for example, mentioned an embodiment where the combination is made so that the other member comes into contact with the top plane part of the hollow convex part and an embodiment where the combination is made so that the other member comes into contact with the bottom plane part of the hollow convex part.

Figure 5A:
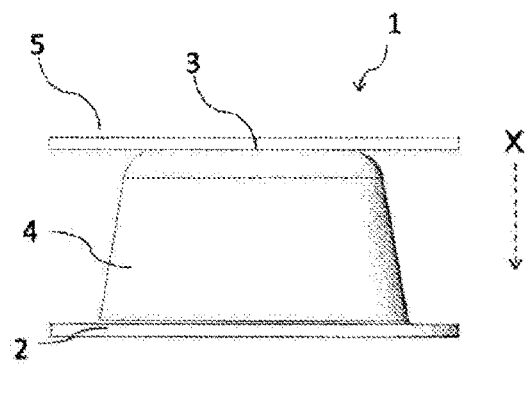
FIGS. 5A and 5B are schematic views of another example of the resin-made impact absorption member of the invention.
Figure 5B:
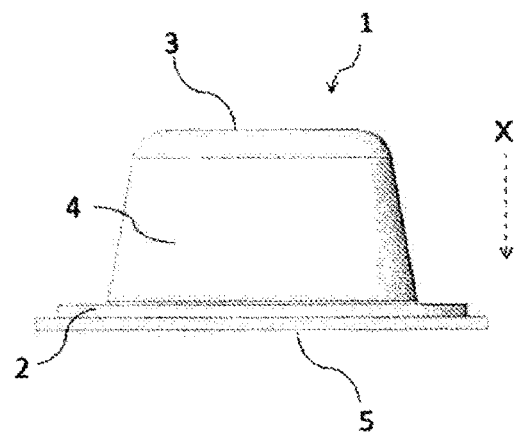

FIGS. 5A and 5B are schematic views showing one example of the case where the resin-made impact absorption member of the invention is used in combination with the other member. The resin-made impact absorption member 1 of the invention may be used in combination so that the other member 5 comes into contact with the top plane part 3 as exemplified in FIG. 5A or may be used in combination so that the other member 5 comes into contact with the bottom plane part 2 as exemplified in FIG. 5B.

The above other member for use in the invention may be made of a resin material or may be made of a metal material such as iron or aluminum. In the case where the other member is made of a resin material, the other constituent may be, for example, press-molded as an integrated article with the hollow convex part or may be joined, as a component different from the hollow convex part, to the hollow convex part by a method such as welding, adhering, or riveting. On the other hand, in the case where the other member is made of a metal material, the member is usually joined to the resin-made impact absorption member of the invention by a method such as insert molding, adhering, or screwing.

As mentioned above, the resin-made impact absorption member of the invention has a hollow convex part composed of a bottom plane part, a top plane part, and an upright plane part connecting the bottom plane part and the top plane part but may have the other constituent other than the hollow convex part within the range where the purpose of the invention is not impaired. The other constituent for use in the invention can be appropriately selected depending on the use application of the resin-made impact absorption member of the invention within the range where the purpose of the invention is not impaired and is not particularly limited but, for example, there may be mentioned a flange part for connection to a peripheral compornent, a component for reinforcing the resin-made impact absorption member, and the like.

[Method for Producing Resin-Made Impact absorption member]

Next, a method for producing the resin-made impact absorption member of the invention will be described. The impact absorption member in the invention can be produced using a generally known method. For example, in the case where a fiber-reinforced resin material using a thermoplastic resin as the matrix resin is used as a resin material for forming the resin-made impact absorption member of the invention, there can be applied a method of heating the fiber-reinforced resin material to a temperature equal to or higher than the softening point beforehand and cold-pressing the material in a mold having a temperature lower than the softening point of the thermoplastic resin constituting the fiber-reinforced resin material. Moreover, there can be also applied a hot press method of charging the fiber-reinforced resin material into a mold having a temperature equal to or higher than the softening point of the thermoplastic resin to press the material and subsequently cooling it to a temperature lower than he softening point of the thermoplastic resin but the production method is not limited thereto. Incidentally, for controlling L within the range defined by the invention, for example, it is sufficient to determine the shape of the mold so that L falls within the range defined by the invention.

[Use Application of Resin-Made Impact Absorption Member]

The resin-made impact absorption member of the invention is a resin-made impact absorption member having a hollow convex part composed of a bottom plane part, a top plane part, and an upright plane part connecting the bottom plane part and the top plane part and is used for suppressing impact to another end side by absorbing impact energy that has been input to one end of the resin-made impact absorption member. The resin-made impact absorption member of the invention is, as it is called, supposed to absorb impact toward a vertical direction to the bottom plane, and is used for absorbing the impact received in a coaxial direction to the vertical direction of the bottom plane. Moreover, the resin-made impact absorption member of the invention can be applied to various components for vehicle bodies.

Examples of the components for vehicle bodies provided with the resin-made impact absorption member of the invention include a crash box, a front side member, a rear side member, a front wheel house upper member, a lower member, and the like but the components are not limited thereto.

The present invention is not limited to the above embodiments. The embodiments are exemplified ones and any embodiments substantially having the same constitution as the technical concept described in Claims of the invention and serving similar effects are included in the technical scope of the invention.

EXAMPLES

The present invention will be described in more detail with reference to Examples, but the invention is not limited to embodiments of the following Examples.

Individual values in the present Examples were determined according to the following methods.

(1) Average Fiber Length of Reinforcing Fiber

With regard to the average fiber length of the reinforcing fiber in a fiber-reinforced resin material, after the fiber-reinforced resin material was heated in a furnace at 500° C. for 1 hour to remove a thermoplastic resin, the length of each of 100 reinforcing fibers randomly extracted was measured with a pair of vernier calipers up to a unit of 1 mm, and an average value thereof was taken as the average fiber length. In the case where the average fiber length was less than 1 mm, the length was measured up to a unit of 0.1 mm under an optical microscope. Incidentally, in the case where the average fiber length of the reinforcing fiber in a thermosetting fiber-reinforced resin material was measured, after the fiber-reinforced resin material was heated in a furnace at 500° C. for 3 hours to remove a thermosetting resin, the length was measured by the same method.

Incidentally, in the present Example, since a constant cut length was used, the number-average fiber length and the weight-average fiber length are coincident.

(2) Volume Content of Reinforcing Fiber in Fiber-Reinforced Resin Material

With regard to the volume content of the reinforcing fiber in a fiber-reinforced resin material, density of the fiber-reinforced resin material was determined by a replacing method in water and the volume content of the reinforcing fiber was calculated from the relationship between the density of the reinforcing fiber alone and the density of the resin alone which had been measured beforehand.

(3) Compressive Modulus and Compressive Strength of Fiber-Reinforced Resin Material The compressive modulus and compressive strength of a fiber-reinforced resin material were measured in accordance with JIS K7076 for a test piece which had been dried at 80° C. under vacuum for 24 hours beforehand.

(4) Impact absorption Characteristic of Resin-Made Impact Absorption Member

For evaluating the impact absorption characteristic of a resin-made impact absorption member, using a drop weight impact tester IM10 manufactured by IMATEK Co., Ltd., the impact absorption characteristic was calculated from a value obtained by dividing the energy absorbed at the time when the resin-made impact absorption member was compressed up to 85% of the height of the member in an impact absorption direction by the weight of the resin-made impact absorption member. An impact absorption member exhibiting a larger impact absorption characteristic is said to be more excellent impact absorption member.

Reference Example 1

Using a PAN-based carbon fiber"TENAX (registered trademark)" STS40-24KS (average fiber diameter: 7 μm) manufactured by TOHO TENAX Co., Ltd. as a reinforcing fiber, which was cut into an average fiber length of 20 mm, and using a Nylon 6 resin A1030 manufactured by UNITIKA Ltd. as a thermoplastic resin, by a pressing apparatus heated to 280° C., they were heated and compressed under a pressure of 2.0 MPa for 5 minutes to prepare a fiber-reinforced resin material A in which the carbon fiber is two-dimensionally randomly oriented in an in-plane direction.

The average fiber length of the obtained fiber-reinforced resin material A was about 20 mm, the compressive modulus was 10 GPa, the compressive strength was 150 MPa, and the density was 1,300 kg/m$^3$.

Reference Example 2

A carbon fiber"TENAX (registered trademark)" STS40-24KS (average fiber diameter: 7 μm) manufactured by TOHO TENAX Co., Ltd. as a reinforcing fiber, which was cut into an average fiber length of 20 mm, and a bisphenol A type epoxy resin "jER (registered trademark)" 828 manufactured by Mitsubishi Chemical Corporation as a thermosetting resin were heated and mixed, then a modified aromatic amine-based curing agent "jER Cure (registered trademark)" W manufactured by Mitsubishi Chemical Corporation as a curing agent was additionally kneaded, and the resulting composition was spread into a flat plate form by a coater to obtain a thermosetting fiber-reinforced resin prepreg B1.

The obtained prepreg B1 was set in a mold and cured under conditions of a heating temperature of 180° C. and a pressure of 1.0 MPa for 4 hours to form a fiber-reinforced resin material B2. The average fiber length of the obtained fiber-reinforced resin material B2 was about 20 mm, the compressive modulus was 10 GPa, the compressive strength was 150 MPa, and the density was 1,300 kg/m$^3$.

Reference Example 3

A fiber-reinforced resin material C was prepared in the same manner as in Reference Example 1 except that the reinforcing fiber was pulverized so that the average fiber length became about 0.5 mm to change the fiber volume content.

The average fiber length of the obtained fiber-reinforced resin material C was about 0.5 mm, the compressive modulus was 5 GPa, the compressive strength was 75 MPa, and the density was 1,200 kg/m$^3$.

[Shape of Resin-Made Impact Absorption Member]

Figure 6A:
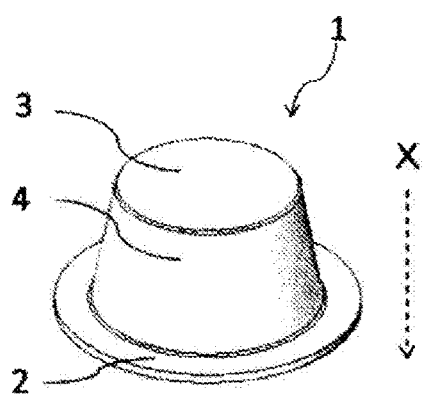
FIGS. 6A and 6B are explanatory views explaining the shape of the resin-made impact absorption member in Examples and Comparative Examples.
Figure 6B:
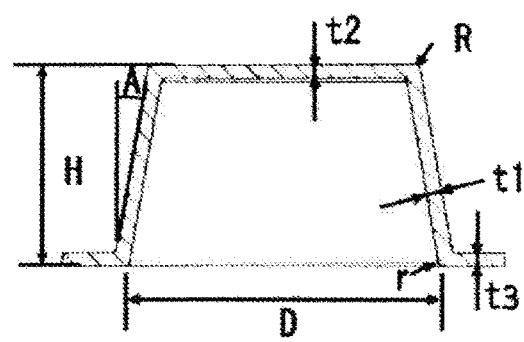

Respective values (r, A, t1, t2, R, H, D) showing dimensions of resin-made impact absorption members of the following individual Examples and Comparative Examples are as shown in FIG. 6. Incidentally, FIG. 6B shows a cross-sectional shape of the resin-made impact absorption member shown in FIG. 6A in an impact absorption direction.

Example 1

The fiber-reinforced resin material A of Reference Example 1 was heated to 280° C. and was formed into a resin-made impact absorption member by cold press molding under a pressure of 10 MPa for 60 seconds. The dimensions of respective parts were as follows: r=1 mm, A=10°, t1=3 mm, t2=3 mm, R=1 mm, H=45 mm, D=70 mm, L=0.28.

When the resin-made impact absorption member of Example 1 was compressed up to 85% of the height of the resin-made impact absorption member in an impact absorption direction so that the impact absorption direction became vertical, the impact absorption characteristic was 28.0 J/g.

Example 2

The fiber-reinforced resin material A of Reference Example 1 was heated to 280° C. and was formed into a resin-made impact absorption member by cold press molding under the same conditions as in Example 1. The dimensions of respective parts were as follows: r=2 mm, A=10°, t1=3 mm, t2=3 mm, R=1 mm, H=45 mm, D=70 mm, L=0.56.

When the resin-made impact absorption member of Example 2 was compressed up to 85% of the height of the resin-made impact absorption member in an impact absorption direction so that the impact absorption direction became vertical, the impact absorption characteristic was 27.6 J/g.

Example 3

The fiber-reinforced resin material A of Reference Example 1 was heated to 280° C. and was formed into a resin-made impact absorption member by cold press molding under the same conditions as in Example 1. The dimensions of respective parts were as follows: r=3 mm, A=10°, t1=3 mm, t2=3 mm, R=1 mm, H=45 mm, D=70 mm, L=0.84.

When the resin-made impact absorption member of Example 3 was compressed up to 85% of the height of the resin-made impact absorption member in an impact absorption direction so that the impact absorption direction became vertical, the impact absorption characteristic was 27.1 J/g.

Example 4

The fiber-reinforced resin material A of Reference Example 1 was heated to 280° C. and was formed into a resin-made impact absorption member by cold press molding under the same conditions as in Example 1. The dimensions of respective parts were as follows: r=1 mm, A=15°, t1=3 mm, t2=3 mm, R=1 mm, H=45 mm, D=70 mm, L=0.26.

When the resin-made impact absorption member of Example 4 was compressed up to 85% of the height of the resin-made impact absorption member in an impact absorption direction so that the impact absorption direction became vertical, the impact absorption characteristic was 25.9 J/g.

Example 5

The fiber-reinforced resin material A of Reference Example 1 was heated to 280° C. and was formed into a resin-made impact absorption member by cold press molding under the same conditions as in Example 1. The dimensions of respective parts were as follows: r=1 mm, A=25°, t1=3 mm, t2=3 mm, R=1 mm, H=45 mm, D=70 mm, L=0.21.

When the resin-made impact absorption member of Example 5 was compressed up to 85% of the height of the resin-made impact absorption member in an impact absorption direction so that the impact absorption direction became vertical, the impact absorption characteristic was 23.3 J/g.

Example 6

The fiber-reinforced resin material A of Reference Example 1 was heated to 280° C. and was formed into a resin-made impact absorption member by cold press molding under the same conditions as in Example 1. The dimensions of respective parts were as follows: r=1 mm, A=30°, t1=3 mm, t2=3 mm, R=1 mm, H=45 mm, D=70 mm, L=0.19.

When the resin-made impact absorption member of Example 6 was compressed up to 85% of the height of the resin-made impact absorption member in an impact absorption direction so that the impact absorption direction became vertical, the impact absorption characteristic was 21.8 J/g.

Example 7

The fiber-reinforced resin material A of Reference Example 1 was heated to 280° C. and was formed into a resin-made impact absorption member by cold press molding under the same conditions as in Example 1. The dimensions of respective parts were as follows: r=1 mm, A=35°, t1=3 mm, t2=3 mm, R=1 mm, H=45 mm, D=70 mm, L=0.17.

When the resin-made impact absorption member of Example 7 was compressed up to 85% of the height of the resin-made impact absorption member in an impact absorption direction so that the impact absorption direction became vertical, the impact absorption characteristic was 19.8 J/g.

Example 8

The fiber-reinforced resin material A of Reference Example 1 was heated to 280° C. and was formed into a resin-made impact absorption member by cold press molding under the same conditions as in Example 1. The dimensions of respective parts were as follows: r=1 mm, A=10°, t1=3 mm, t2=4.5 mm, R=8 mm, H=45 mm, D=70 mm, L=0.28.

When the resin-made impact absorption member of Example 8 was compressed up to 85% of the height of the resin-made impact absorption member in an impact absorption direction so that the impact absorption direction became vertical, the impact absorption characteristic was 20.4 J/g.

Example 9

The fiber-reinforced resin material A of Reference Example 1 was heated to 280° C. and was formed into a resin-made impact absorption member by cold press molding under the same conditions as in Example 1. The dimensions of respective parts were as follows: r=1 mm, A=10°, t1=3 mm, t2=6 mm, R=8 mm, H=45 mm, D=70 mm, L=0.28.

When the resin-made impact absorption member of Example 9 was compressed up to 85% of the height of the resin-made impact absorption member in an impact absorption direction so that the impact absorption direction became vertical, the impact absorption characteristic was 20.4 J/g.

Example 10

The thermosetting fiber-reinforced resin prepreg B1 of Reference Example 2 was formed into a resin-made impact absorption member by curing under conditions of a heating temperature of 180° C. and a pressure of 1.0 MPa for 4 hours. The dimensions of respective parts were as follows: r=1 mm, A=10°, t1=3 mm, t2=3 mm, R=1 mm, H=45 mm, D=70 mm, L=0.28.

When the resin-made impact absorption member of Example 10 was compressed up to 85% of the height of the resin-made impact absorption member in an impact absorption direction so that the impact absorption direction became vertical, the impact absorption characteristic was 28.0 J/g and thus an impact absorption characteristic almost equal to the case of Example 1 was shown.

Example 11

The fiber-reinforced resin material C of Reference Example 3 was heated to 280° C. and was formed into a resin-made impact absorption member by cold press molding under the same conditions as in Example 1. The dimensions of respective parts were as follows: r=1 mm, A=10°, t1=3 mm, t2=3 mm, R=1 mm, H=45 mm, D=70 mm, L=0.28.

When the resin-made impact absorption member of Example 11 was compressed up to 85% of the height of the resin-made impact absorption member in an impact absorption direction so that the impact absorption direction became vertical, the impact absorption characteristic was 13.4 J/g.

Example 12

The fiber-reinforced resin material C of Reference Example 3 was heated to 280° C. and was formed into a resin-made impact absorption member by cold press molding under the same conditions as in Example 1. The dimensions of respective parts were as follows: r=3 mm, A=10°, t1=3 mm, t2=3 mm, R=1 mm, H=45 mm, D=70 mm, L=0.84.

When the resin-made impact absorption member of Example 12 was compressed up to 85% of the height of the resin-made impact absorption member in an impact absorption direction so that the impact absorption direction became vertical, the impact absorption characteristic was 12.1 J/g.

Comparative Example 1

The fiber-reinforced resin material A of Reference Example 1 was heated to 280° C. and was formed into a resin-made impact absorption member by cold press molding under the same conditions as in Example 1. The dimensions of respective parts were as follows: r=4 mm, A=10°, t1=3 mm, t2=3 mm, R=1 mm, H=45 mm, D=70 mm, L=1.12.

When the resin-made impact absorption member of Comparative Example 1 was compressed up to 85% of the height of the resin-made impact absorption member in an impact absorption direction so that the impact absorption direction became vertical, the impact absorption characteristic was 19.5 J/g.

Comparative Example 2

The fiber-reinforced resin material A of Reference Example 1 was heated to 280° C. and was formed into a resin-made impact absorption member by cold press molding under the same conditions as in Example 1. The dimensions of respective parts were as follows: r=8 mm, A=10°, t1=3 mm, t2=3 mm, R=1 mm, H=45 mm, D=70 mm, L=2.24.

When the resin-made impact absorption member of Comparative Example 2 was compressed up to 85% of the height of the resin-made impact absorption member in an impact absorption direction so that the impact absorption direction became vertical, the impact absorption characteristic was 18.1 J/g.

Comparative Example 3

The fiber-reinforced resin material A of Reference Example 1 was heated to 280° C. and was formed into a resin-made impact absorption member by cold press molding under the same conditions as in Example 1. The dimensions of respective parts were as follows: r=13 mm, A=10°, t1=3 mm, t2=3 mm, R=1 mm, H=45 mm, D=70 mm, L=3.64.

When the resin-made impact absorption member of Comparative Example 3 was compressed up to 85% of the height of the resin-made impact absorption member in an impact absorption direction so that the impact absorption direction became vertical, the impact absorption characteristic was 18.7 J/g.

Comparative Example 4

The fiber-reinforced resin material A of Reference Example 1 was heated to 280° C. and was formed into a resin-made impact absorption member by cold press molding under the same conditions as in Example 1. The dimensions of respective parts were as follows: r=15 mm, A=10°, t1=3 mm, t2=3 mm, R=1 mm, H=45 mm, D=70 mm, L=4.20.

When the resin-made impact absorption member of Comparative Example 4 was compressed up to 85% of the height of the resin-made impact absorption member in an impact absorption direction so that the impact absorption direction became vertical, the impact absorption characteristic was 18.1 J/g.

Comparative Example 5

The fiber-reinforced resin material C of Reference Example 3 was heated to 280° C. and was formed into a resin-made impact absorption member by cold press molding under the same conditions as in Example 1. The dimensions of respective parts were as follows: r=4 mm, A=10°, t1=3 mm, t2=3 mm, R=1 mm, H=45 mm, D=70 mm, L=1.12.

When the resin-made impact absorption member of Comparative Example 5 was compressed up to 85% of the height of the resin-made impact absorption member in an impact absorption direction so that the impact absorption direction became vertical, the impact absorption characteristic was 10.6 J/g.

Comparative Example 6

The fiber-reinforced resin material C of Reference Example 3 was heated to 280° C. and was formed into a resin-made impact absorption member by cold press molding under the same conditions as in Example 1. The dimensions of respective parts were as follows: r=15 mm, A=10°, t1=3 mm, t2=3 mm, R=1 mm, H=45 mm, D=70 mm, L=4.20.

When the resin-made impact absorption member of Comparative Example 6 was compressed up to 85% of the height of the resin-made impact absorption member in an impact absorption direction so that the impact absorption direction became vertical, the impact absorption characteristic was 10.4 J/g.

Figure 7:
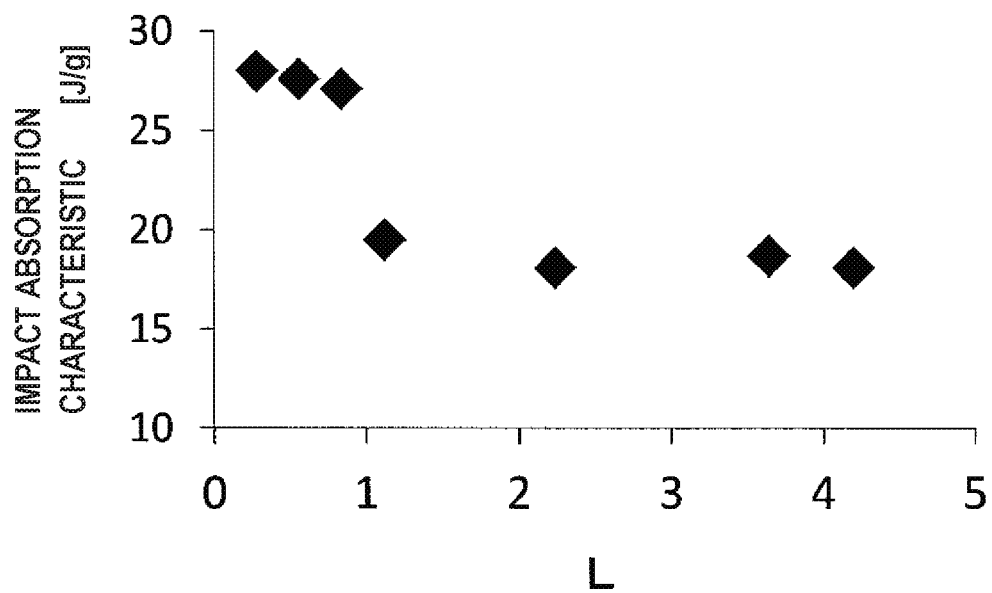
FIG. 7 is a graph showing a relationship between L and the impact absorption characteristic in Examples and Comparative Examples.

FIG. 7 shows results of Examples 1 to 3 and Comparative Examples 1 to 4 where the fiber-reinforced resin material A is used and t2/t1 and A are common. As shown in the figure, it is realized that the impact absorption characteristic is remarkably improved when L becomes less than 1.1.

Figure 8:
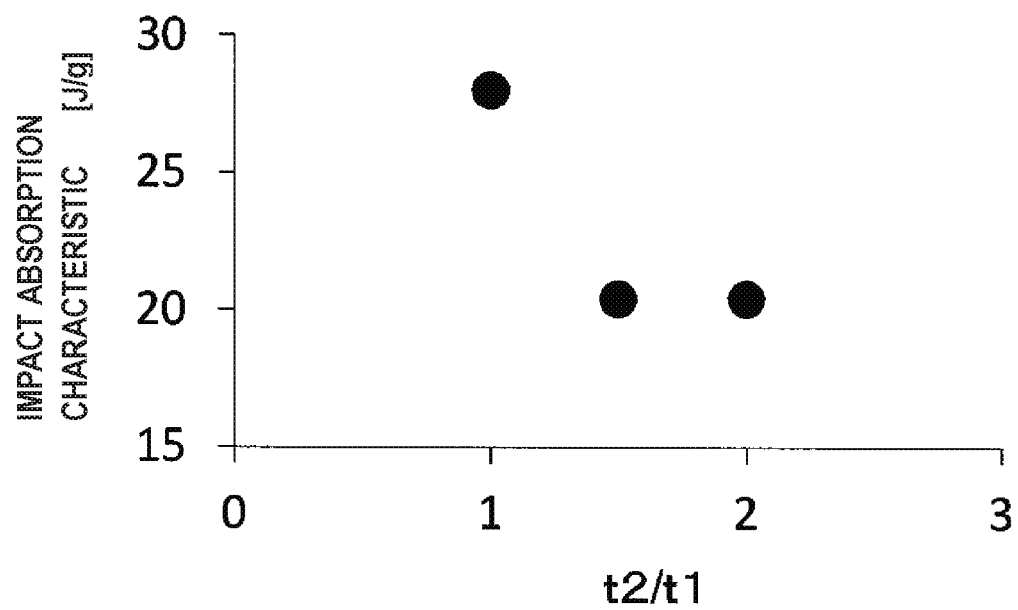
FIG. 8 is a graph showing a relationship between t2/t1 and the impact absorption characteristic in Examples and Comparative Examples.

Moreover, for Examples 1, 8, and 9 where L is 0.28, FIG. 8 shows a relationship between t2/t1 and the impact absorption characteristic. As shown in the figure, even when L is the same, it is realized that the impact absorption characteristic is remarkably improved when t2/t1 becomes less than 1.1.

Furthermore, from the results of Examples 4 to 7, it is realized that the impact absorption characteristic is improved as A decreases.

In addition, from the results of Example 1 and Example 11, Example 3 and Example 12, Comparative Example 1 and Comparative Example 5, and Comparative Example 4 and Comparative Example 6 where L, t2/t1 and A are common, fiber-reinforced resin material is different, it is realized that the impact absorption characteristic is remarkably improved when the average fiber length is 1 mm or more, the compressive modulus is 10 GPa or more, and the Compressive strength is 150 MPa or more.

INDUSTRIAL APPLICABILITY

The resin-made impact absorption member of the present invention is used for suppressing impact to another end side by absorbing impact energy that has been input to one end, and can be used, for example, in an impact absorption device for vehicle bodies and the like.

As above, embodiments and examples of the present invention has been described in detail but they are merely exemplified ones and the invention can be performed as embodiments where various changes are made within a range where they do not depart from the gist thereof. The present application is based on Japanese Patent Application No. 2014-032954 filed on Feb. 24, 2014, and the contents are incorporated herein by reference.

DESCRIPTION OF REFERENCE NUMERALS AND SIGNS

1 Impact absorption member
2 Bottom plane part
3 Top plane part
4 Upright plane part
5 Other member
X Impact absorption direction

The invention claimed is:

1. A resin-made impact absorption member that is made of a resin material, comprising a hollow convex part having a bottom plane part, a top plane part, and an upright plane part that connects the bottom plane part and the top plane part, wherein the top plane part receives an impact in a coaxial direction to a vertical direction of the bottom plane part;

wherein the bottom plane part has an annular shape;

wherein the upright plane part stands upward from an inner periphery of the bottom plane part and the upright plane part has a tubular form;

wherein the upright plane part has an annular top surrounding the top plane part and connected to an outer periphery of the top plane part to form a shape closed at a cross section in the vertical direction; and wherein L defined by the following formula (1) is $0<L<1.1$:

$$L=\{r\times\tan(45°-A/2)\}/t1 \tag{1}$$

wherein r is a curvature radius (mm) at a boundary portion between a lower surface of the bottom plane part and an inner surface of the upright plane part, A is an angle (°) formed between a vertical direction against an in-plane direction of the bottom plane part and the upright plane part, and t1 is an average thickness (mm) of the upright plane part.

2. The resin-made impact absorption member according to claim 1, wherein the hollow convex part is integrally formed as a single member.

3. The resin-made impact absorption member according to claim 1, wherein, in a case where an average thickness of the top plane part is t2, a ratio of t2 to t1, t2/t1, is $0<t2/t1<1.5$.

4. The resin-made impact absorption member according to claim 1, wherein A is $0°<A<25°$.

5. The resin-made impact absorption member according to claim 1, comprising a plurality of the hollow convex parts having the same shape as each other.

6. The resin-made impact absorption member according to claim 1, wherein the resin material is a fiber-reinforced resin material containing a reinforcing fiber and a matrix resin.

7. The resin-made impact absorption member according to claim 6, wherein the reinforcing fiber has an average fiber length within a range of 1 mm to 100 mm and the fiber-reinforced resin material has a compressive modulus of 10 GPa or more and a compressive strength of 150 MPa or more.

8. The resin-made impact absorption member according to claim 1, wherein L defined by the formula (1) falls within the range of $0<L<0.85$.

9. The resin-made impact absorption member according to claim 1, wherein L defined by the formula (1) falls within the range of $0<L<0.6$.

* * * * *